United States Patent
Rogne et al.

(10) Patent No.: US 7,741,625 B2
(45) Date of Patent: Jun. 22, 2010

(54) INFRARED SOURCE

(75) Inventors: Henrik Rogne, Oslo (NO); Dag Thorstein Wang, Oslo (NO); Trond Andreas Hansen, Drammen (NO); Sigurd Teodor Moe, Oslo (NO); Alain Ferber, Haslum (NO)

(73) Assignee: Sintef, Trondheim (NO)

( * ) Notice: Subject to any disclaimer, the term of this patent is extended or adjusted under 35 U.S.C. 154(b) by 450 days.

(21) Appl. No.: 11/575,218

(22) PCT Filed: Sep. 13, 2005

(86) PCT No.: PCT/NO2005/000335

§ 371 (c)(1),
(2), (4) Date: Mar. 14, 2007

(87) PCT Pub. No.: WO2006/031125

PCT Pub. Date: Mar. 23, 2006

(65) Prior Publication Data

US 2008/0272389 A1    Nov. 6, 2008

(30) Foreign Application Priority Data

Sep. 15, 2004  (NO) .................................. 20043883

(51) Int. Cl.
  *G01J 1/00* (2006.01)
  *H01L 31/00* (2006.01)
(52) U.S. Cl. ...................................... 250/495.1; 257/14
(58) Field of Classification Search .................. 257/99, 257/102, E33.044, E33.001, 14; 250/495.1, 250/504 R, 339.13, 503.1, 493.1; 362/294, 362/257
See application file for complete search history.

(56) References Cited

U.S. PATENT DOCUMENTS

| 4,754,141 A | * | 6/1988 | Mindock .................... 250/343 |
| 5,285,131 A | | 2/1994 | Muller et al. |
| 5,591,679 A | | 1/1997 | Jakobsen et al. |

(Continued)

FOREIGN PATENT DOCUMENTS

JP    2005-140594    *    6/2005

OTHER PUBLICATIONS

Mindock, "Emissible modulation of semiconductor infrared (IR) source", 1990, Proc. SPIE, vol. 1307, pp. 426-432.*

(Continued)

*Primary Examiner*—Thomas L Dickey
*Assistant Examiner*—Nikolay Yushin
(74) *Attorney, Agent, or Firm*—Vern Maine & Associates

(57) ABSTRACT

A sealed infrared radiation source includes an emitter membrane stimulated by an electrical current conducted through the membrane, which acts like an electrical conductor, wherein the membrane is mounted between first and second housing parts, at least one being transparent in the IR range, each housing part defining a cavity between the membrane and the respective housing part of each side of the membrane. The housing parts are at least partially electrical conductive, and a first of the housing parts is electrically coupled to a first end of the electrical conductor and insulated from the second end of the electrical conductor, the second housing part being electrically coupled to a second end of the electrical conductor and being insulated from the first end of the electrical conductor, thus allowing a current applied from the first housing part to the second housing part to pass through and heat the membrane.

4 Claims, 10 Drawing Sheets

U.S. PATENT DOCUMENTS

| | | |
|---|---|---|
| 5,814,870 A | 9/1998 | Spaeth |
| 5,827,438 A | 10/1998 | Blomberg et al. |
| 6,169,284 B1 | 1/2001 | Caputo et al. |
| 6,204,083 B1 * | 3/2001 | Kodato et al. ............... 438/43 |
| 6,222,190 B1 | 4/2001 | Bernstein et al. |
| 6,297,511 B1 * | 10/2001 | Syllaios et al. ........... 250/495.1 |
| 7,184,368 B2 | 2/2007 | Johansen et al. |

OTHER PUBLICATIONS

Das et al., "Low Power Polysilicon Sources for IR Applications", 1998, Proceedings of 5th International conference on Solid State and Integrated Circuit Technology, Oct. 21-23, 1998, pp. 884-886.*

* cited by examiner

INFRARED SOURCE

RELATED APPLICATIONS

This application is a 371 US National Phase of PCT Application No. PCT/NO2005/000335, filed 13 Sep. 2005, which claims priority to Norwegian Application No. NO 2004 3883, filed 15 Sep. 2004. Each of these applications is herein incorporated by reference in their entirety for all purposes.

TECHNICAL FIELD

This invention relates to a sealed infrared radiation source, comprising an emitter comprising a thin structure, e.g. a membrane or thin band, being stimulated by an electrical current conducted through said membrane, said membrane thus comprising an electrical conductor.

BACKGROUND OF THE INVENTION

Usually sealed infrared sources have electrical conductors for supplying energy to the emitter which pass between the layers constituted by glass housings and silicon membrane layers. This approach, however, has several disadvantages such as complicated production and temperature characteristics.

There is described in the art an infrared source in the 2 micron IR range comprising a membrane being encased hermetically by the substrate and a silicon nitride window. The emitter membrane is doped with boron to increase the efficiency of the IR emission from the source. The solution comprises electrical coupling of the power supply to the source through layers of metallized aluminium, which complicates the production and sealing of the casing. This and similar solutions have the disadvantage of being complicated to produce, as they comprise several different materials.

The use of silicon that is heavily doped with Boron or Phosphor to increase the efficiency of IR radiation of a source is also known.

SUMMARY OF THE INVENTION

It is an object of this invention to provide an infrared source that can be mass produced using silicon technology. The source should be sealed using ordinary bonding techniques to withstand both temperature variations and other strains.

The present invention relates to a source and a method for making this source wherein current can be supplied to an emitter contained within the source through parts included in the housing, the housing parts also being made from silicon and being bonded to the emitter part by fusion bonding or similar.

Thus a hermetically sealed source can be produced according to a very simple process, preferably a so-called fusion bonding process. The present invention thus provides a solution that is suitable for mass production whereby all electrical conductor paths are led through the whole stack. Thus the source may be hermetically sealed in vacuum or in an inert gas during production and it is possible to pack e.g. 1500 sources at one time. Today the packing costs for such sources are as high as the costs for the sources themselves, as each chip is hand picked, glued to a can, wire bonded to the can, and a top with an IR window is welded to the can. Thus the present invention provides significant cost reductions.

According to one aspect of the present invention the emitter is an emitting membrane that preferably comprises a silicon layer that is doped with a very high concentration of Boron or Phosphor. This doped area is in thermal contact with an electrically conducting layer on the emitter, but is electrically insulated from the electrically conducting layer on the emitter. The electrically conducting layer on the emitter has sufficient resistance to serve as a heater for the highly doped silicon. While silicon is usually semitransparent in the infrared spectrum the high doping makes the silicon opaque and therefore it emits radiation in the near infrared spectrum. The absorption properties of the highly doped silicon are well known in sensors and sources.

Thus in this aspect the invention comprises an emitter that is made from silicon and is highly doped with Boron or Phosphor, and which is in thermal contact with a resistor that heats the emitter when a current is applied to it. The emitter may be packed in a silicon housing and be surrounded by a sealed cavity. Throughout this specification the terms emitter/radiating part and membrane are refer to the function and the form, respectively, of the active part of the source.

The invention will now be described with reference to the accompanying drawings, illustrating the invention by way of examples. It should be noted that the scales in the drawings are distorted to simplify their understanding.

DETAILED DESCRIPTION OF THE INVENTION

Figure 1:
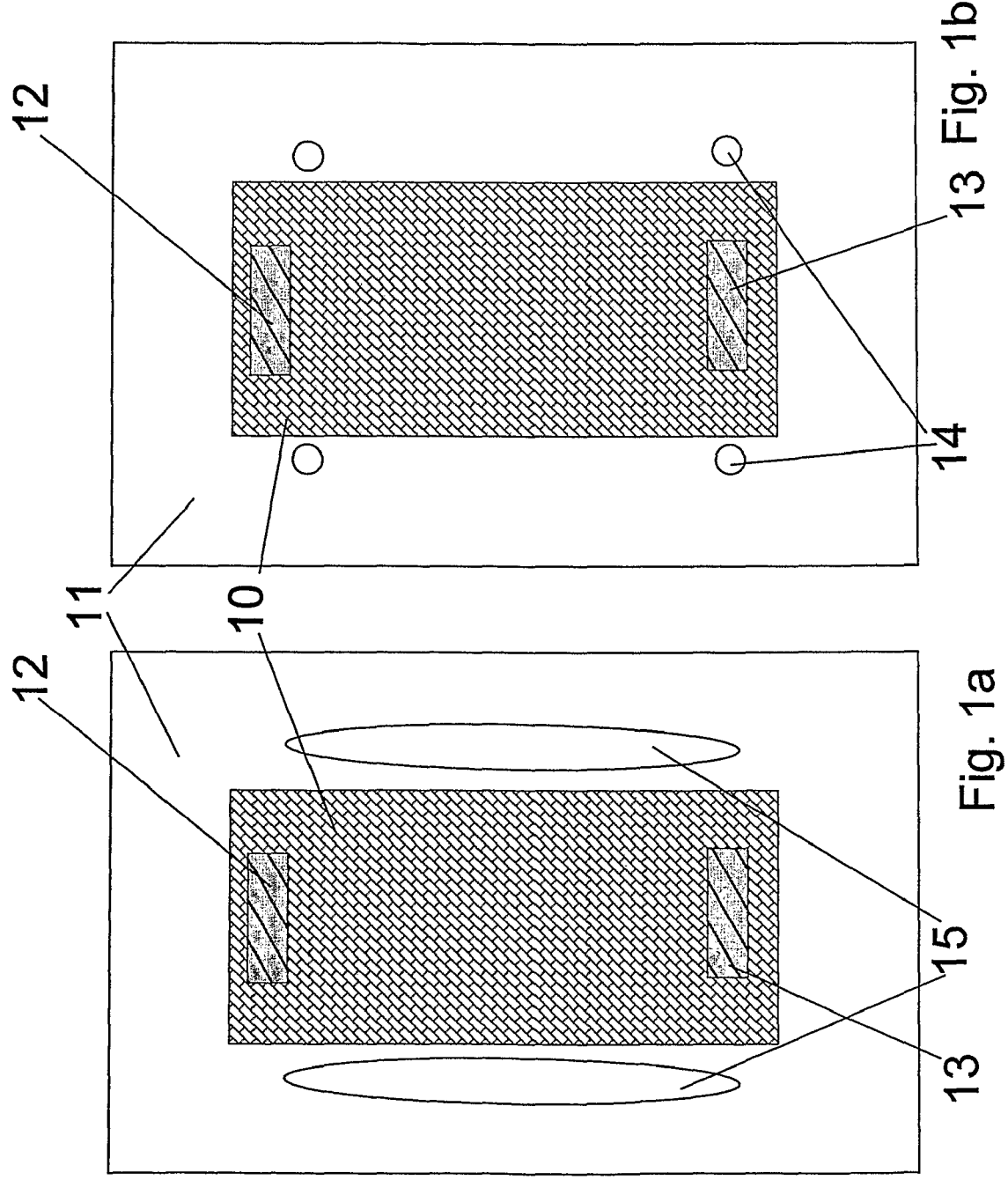
FIGS. 1a and 1b illustrate the membranes of two embodiments of the invention as seen from above.
Figure 2:
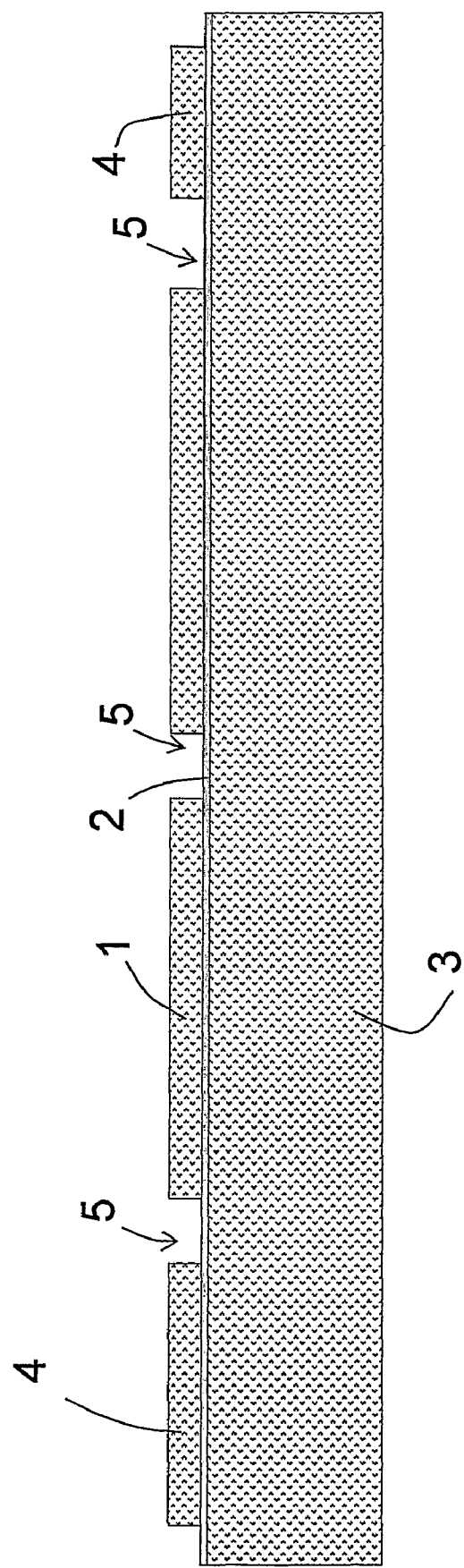
FIGS. 2-8 illustrate various stages of one method for producing a source.

The invention is susceptible of numerous embodiments. The description that follows is illustrative but not exhaustive of the scope of the invention. In FIGS. 1a and 1b a top view of the emitting part of two alternative versions of the invention are illustrated. In these embodiments the emitter is provided by an EPI membrane 11 comprising a conductive polysilicon area 10. The membrane also comprises electrical contact areas 12, 13 for providing coupling to upper and lower parts of the source housing.

The membrane also comprises holes 14, 15 for pressure equilibration between the two sides of the membrane. In FIG. 1a the holes are large so as to provide heat insulation between the radiating part 10 and the remaining part of the membrane. In this case the emitting part 10 acts as a radiating band or strip which may be made with a chosen width depending on the intended use. This band shaped embodiment may provide fast response, but will have slow heat conduction away from the sensor, thus increasing the risk for overheating.

In FIG. 1b the radiating part 10 makes almost full contact with the surrounding walls, which improves the heat transfer ratio to the environment through the material.

The source according to the invention is produced as illustrated in the accompanying drawings, FIGS. 2-8. According to one method of production a first silicon layer 4 is provided on a silicon substrate 3 and being insulated from the substrate by an oxide layer 2. Holes 5 are etched in the first silicon layer 4 for providing pressure equilibration etc corresponding to the openings 14, 15 shown in FIGS. 1a, 1b. A selected part 1 of the silicon layer 4 chosen to act as the emitter 1 in the source is doped with a high concentration of Boron or Phosphor to increase the efficiency, as described above.

Figure 3:
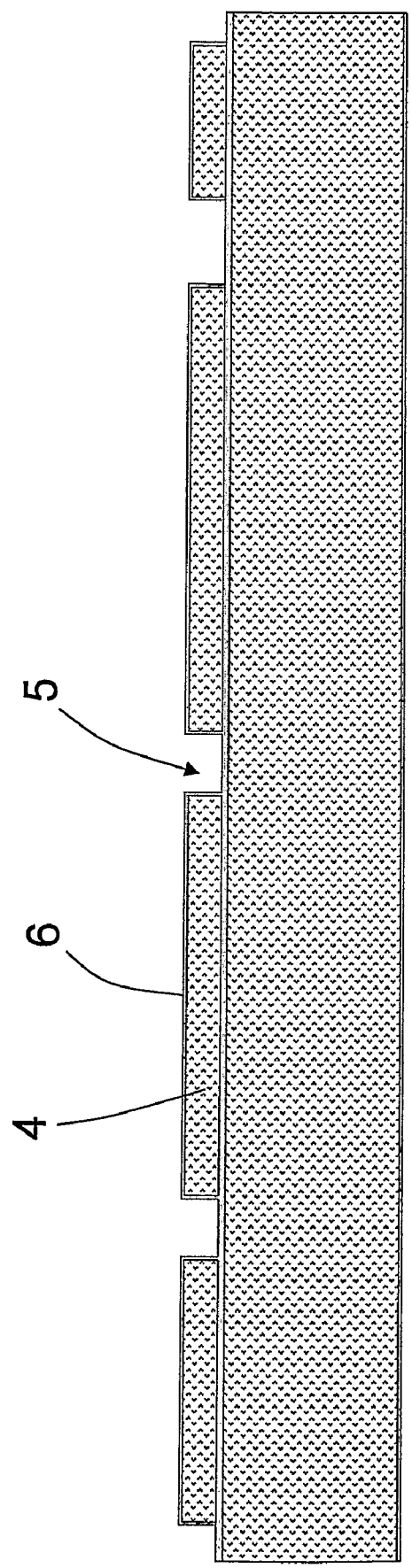

In FIG. 3 an oxide layer 6 is then provided on the first silicon layer 4, including the selected part 1 and the holes 5.

Figure 4:
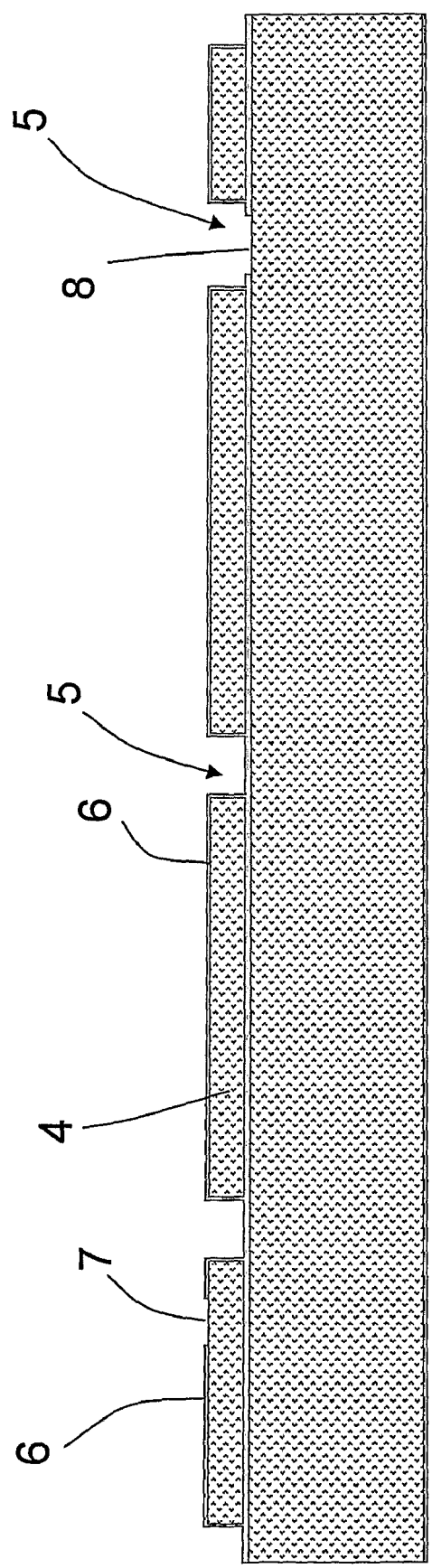

As shown in FIG. 4 openings 7, 8 are provided in the oxide layer 6. One of said openings 8 being in one of the holes 5 through the first silicon layer 4, so as to provide a hole directly through to the substrate 3. Another of said openings 7 is provided to obtain contact through the oxide layer 6 to the first silicon layer 4, the position of this opening not being on the highly doped emitter part 1.

Figure 5:
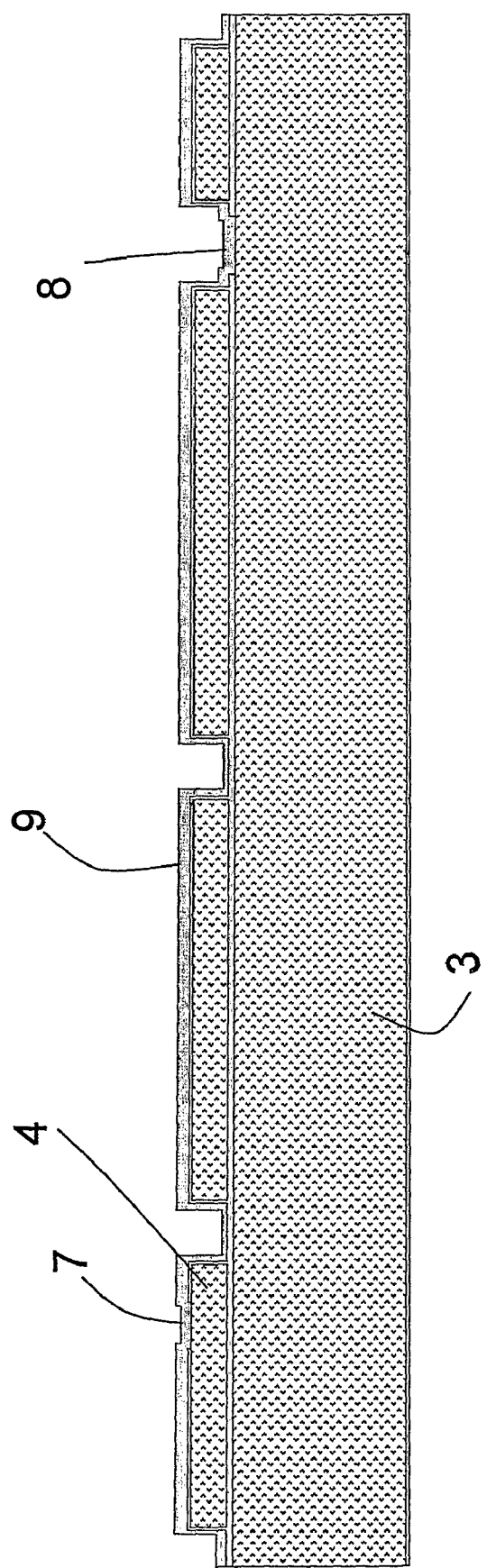

In FIG. 5 an electrical conductive layer 9 (e.g. doped polysilicon) is provided on the first silicon layer 4 thus also covering the holes and openings in the upper oxide layer 6. Thus the electrically conductive layer provides electrical contact through the openings 7, 8 to both the substrate 3 and at least a part of the first silicon layer 4.

Figure 6:
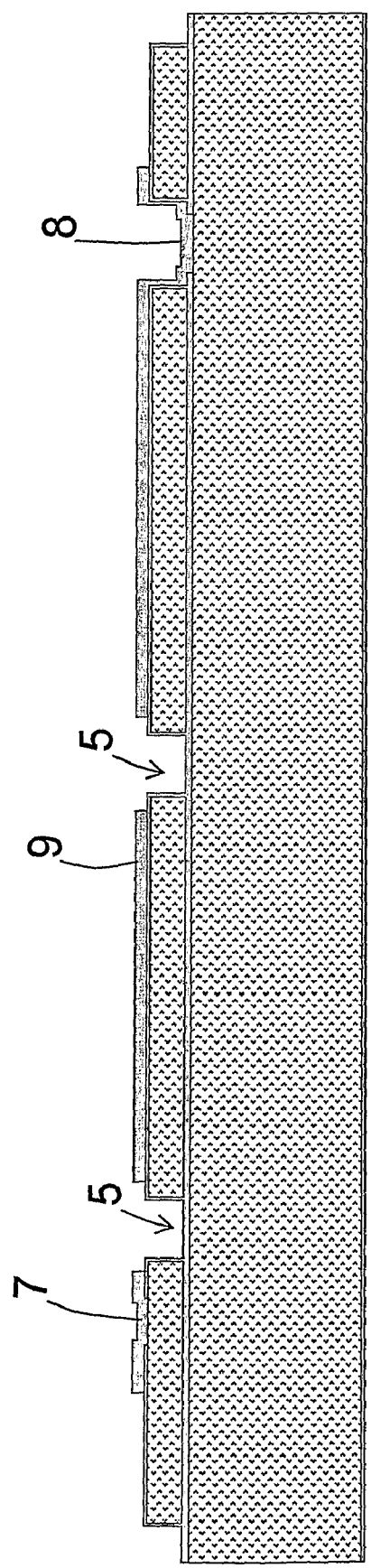
Figure 7:
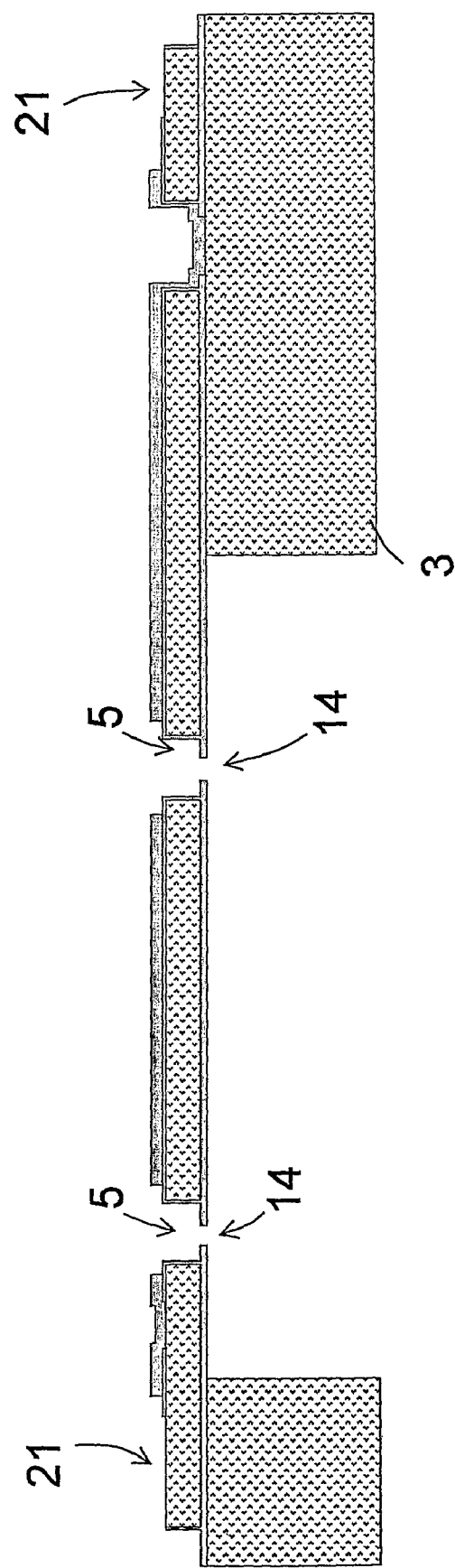

The electrically conductive polysilicon layer 9 is then, see FIG. 6, removed from the holes 5, except from the hole being provided with the opening 8 to the substrate 3, and from the rim area 21 (see FIG. 7) along the rim of first silicon layer 4. Thus electrical coupling is obtained from the rim area 21, through the opening 7 to the polysilicon layer, past the Boron or Phosphor doped emitter area 1, and through the opening 8 in a hole in the first silicon layer 4 to the substrate 3.

The oxide layer 6 is also removed from the rim 21 of the first silicon layer and from the holes 5 not provided with the conductive polysilicon layer, and a cavity is etched through the substrate 3 from below up to the lower oxide layer 2 under the Boron or Phosphor doped emitter area 1 and the holes 5. Thus through-holes 14 are obtained connecting the cavity formed in substrate 3 and the upper side of the emitter area 1. Thus the emitter area is left as a membrane enclosed in an oxide layer and being provided with an electrically conductive heater layer, which in this embodiment is doped polysilicon.

Figure 8:
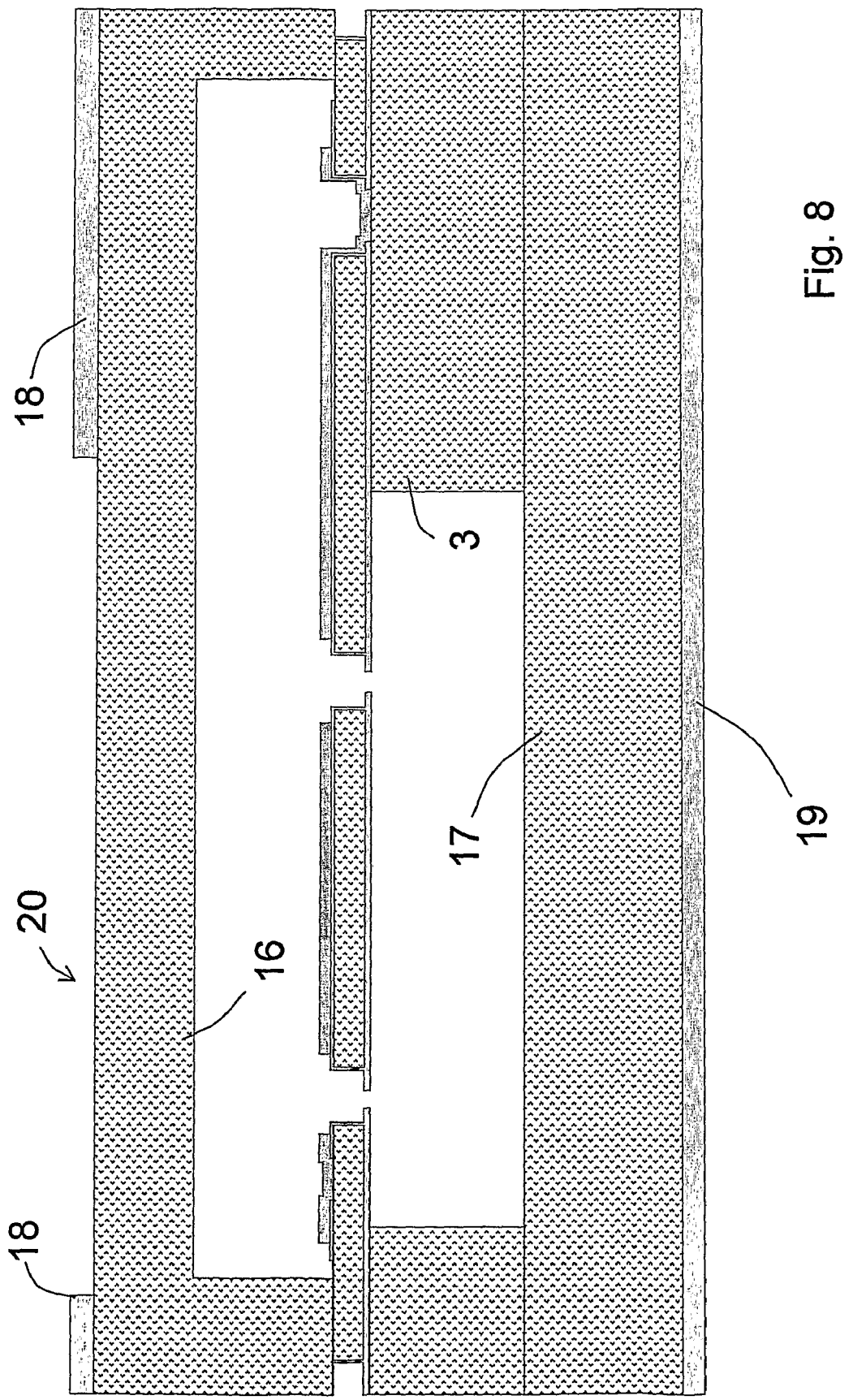

As shown in FIG. 8 new silicon housing parts 16, 17 are then laminated over and below the element, preferably using a bonding process. The upper housing part 16 defines a cavity and is bonded to the first silicon layer 4 along the rim area 21 where the oxide layer was removed, thus providing electrical contact between the upper housing and the first silicon layer. The lower housing part 17 is bonded to the substrate 3 thus defining a lower cavity. As mentioned above the two cavities are provided with pressure equilibration holes 14 between them, but are otherwise sealed, and may be filled with inert gas or vacuum to avoid oxidation. The lower housing part is provided with electrical contact with the electrically conductive layer of polysilicon through hole 5 provided by opening 8 in the silicon layer 4. According to an alternative embodiment the lower housing part is also provided with a cavity under the emitter area 1.

Metal layers 18, 19 may then be provided on the upper and lower housing parts 16, 17. One of said metallic layers should be provided with a window 20 above the emitter area 1 so as to allow the emitted infrared radiation pass through. The undoped silicon material in the housing 16 is transparent to infrared radiation.

Figure 9:
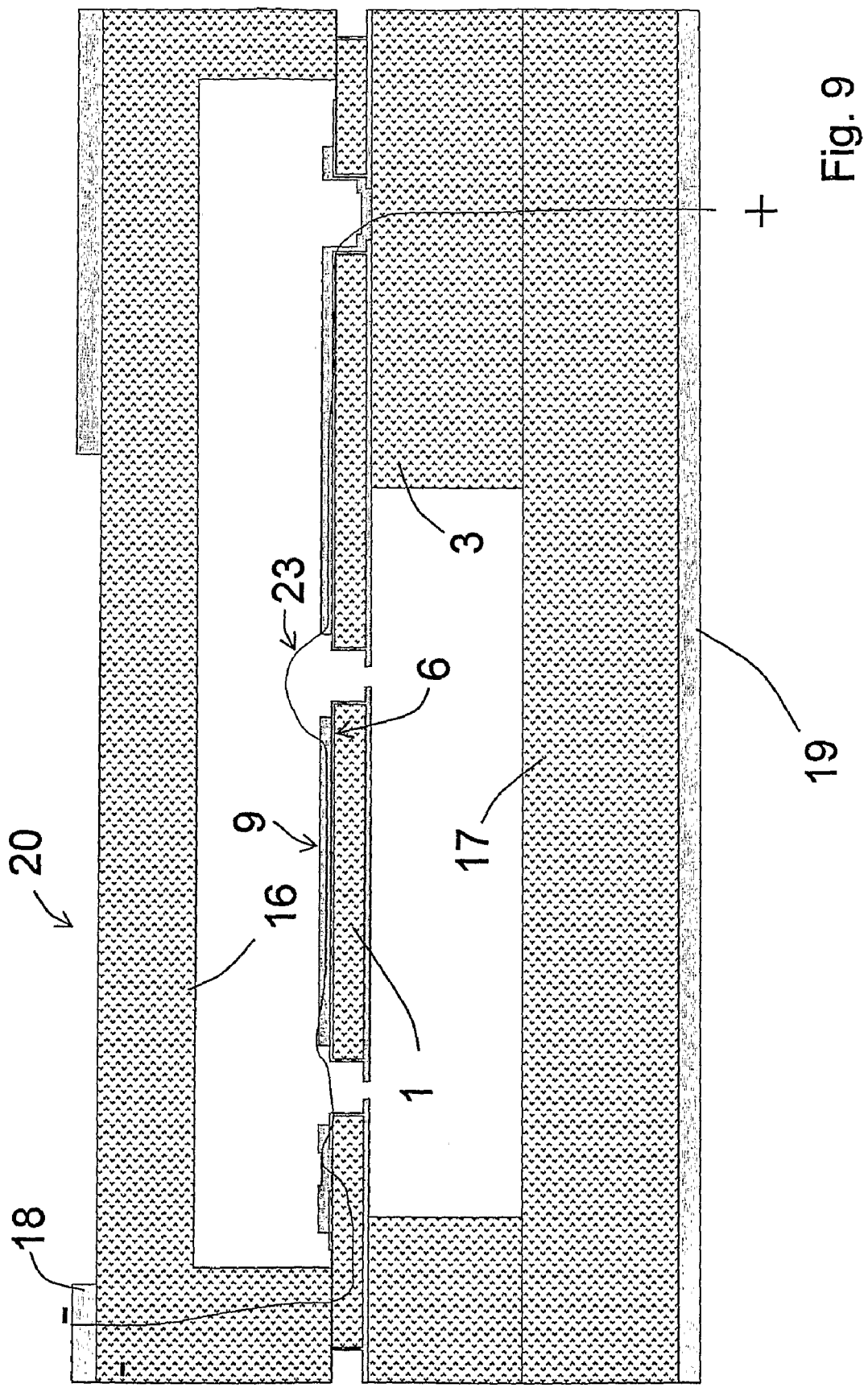
FIG. 9 illustrates the function of the IR source.

An electrical current between them indicated by the line 23 in FIG. 9 will then travel from the first housing part through the connection with the first silicon layer to the electrically conductive layer through the opening in the oxide layer. It then passes the electrically conductive layer provided on but insulated from the highly Boron or Phosphor doped membrane and through the hole in the first silicon layer and opening in the oxide layer to the substrate, and further to the lower housing part. Although the holes 5 are shown in the drawings these have limited sizes, as do the holes 14, 16 in FIGS. 1a and 1b, and the electrical current path indicated by reference numeral 23 propagates around them unhindered.

Thus no separate electrical conductors are needed for providing a current to the membrane, only electrical contacts provided outside the housing. This requires only standard technology. Although the illustrated embodiment includes electrical contact 18, 19 on the upper or lower surfaces of the housing other electrically equivalent solutions may of course be applied, e.g. on the sides of the housing or surfaces protruding from the sides. One aspect of this invention provides a radiation source and a method for producing this which may be efficiently sealed using bonding techniques or such like.

According to an alternative embodiment of the invention optical elements, such as a lens or diffractive optical elements are provided on or in the structure of one of the housing parts, thus shaping or focussing the infrared light emitted from the membrane. A diffractive optical element is especially advantageous if the light source is small or collimated, or if a distance is provided between the source and the optical elements. A filter may also be added to modulate the wavelength distribution.

As mentioned above the device is primarily meant to be mass produced with silicon, being constructed by micromachining a radiation element in a silicon wafer. In another wafer a cavity is etched, so that the cavity is positioned above the radiation element. A third wafer, in which a cavity also may be etched, is laminated under the radiation element. The lamination may be performed using a so-called fusion bonding process, which provides a completely sealed coupling between the two.

As illustrated in FIG. 9 electrical contact is provided to the radiation element through the top wafer, which is coupled to an insulated epi-layer on the mid wafer, up from the epi-layer to a doped poly-Si layer extending above the emitter area 1, down from the poly-Si layer through the epi-layer but insulated therefrom and further through an insulating oxide layer to the substrate of the mid wafer and down to the bottom wafer. It is thus possible to couple directly to the top of the upper wafer and to the surface of the bottom wafer, thus to send a current through the stack for heating the radiation element. When the radiation element is heated the IR radiation goes through the top wafer, which is transparent to IR because the doping level is low. The emitted radiation corresponds essentially to a grey body.

It should be noted that the scales of the drawings above are exaggerated, especially in the ration between height and length. Typical dimensions of the radiation source are as follows:

| | |
|---|---|
| The thickness of the radiation element: | a few μm |
| Length/width of the radiaton element: | typically in the range from a few hundred μm to a few mm. |
| Length/width of the chip: | A couple of mm |
| Thickness of chip: | Typically 1-2 mm |
| Wafer thickness: | Typically 300-500 μm |

The radiation source according to the invention is possible to produce using standard process steps of semiconductor technology. Silicon wafers are for example processed using photolithography, oxidation of silicon, surface depositing, epitaxial growth of surface layers, implanting of conductors, resistors and etch stops with suitable atoms.

Diffusion of implanted atoms

Etching for freeing mechanical structures, in which the etching process is stopped against doped or implanted areas.

Processing this infrared radiation source will typically follow these steps:

Grow highly doped silicon on a silicon substrate wafer wherein the surface silicon is insulated by an oxide.

Grow oxide on this thin highly doped silicon layer.

Deposit a thin polysilicon film on this oxide layer.

Make insulated electrical contact points between the polysilicon layer and the grown silicon layer, and between the polysilicon layer and the substrate.

Etch a 4 μm thick structure from the back

Pattern the surface layers with standard processes.

Etch cavities in the wafer to be bonded on top of the element wafer.

Deposit aluminium contacts on the opposite side of the cavity.

If applicable, etch cavities in the wafer to be laminated under the element wafer.

Deposit aluminium contacts in the opposite side from the cavity and surface to be bonded with the element wafer.

Laminate the three wafers with fusion bonding.

As the emitter membrane may be subject to large temperature fluctuations it may be advantageous to provide temperature sensors such as a temperature sensitive resistor or diode on the emitter, the sensor being provided with electrical conductors for coupling to a temperature measuring means for monitoring the temperature of the emitter, said temperature measuring means being provided in the housing or externally for monitoring the temperature of the emitter. Other temperature measuring means may be employed to monitor the temperature of the emitting membrane, e.g. positioned in the housing. Other variations and alternatives may of course also be made by a person skilled in the art within the scope of this invention, such as providing the electrical contacts on the sides of the source housing or variations in the materials used to manufacture the unit.

As is clear from FIG. 9 the emitting part of the source is constituted by a conductive layer 9, e.g. polysilicon, and a doped emitter area 1, e.g. doped with Boron or Phosphor, being separated by an insulating layer 6.

Figure 10:
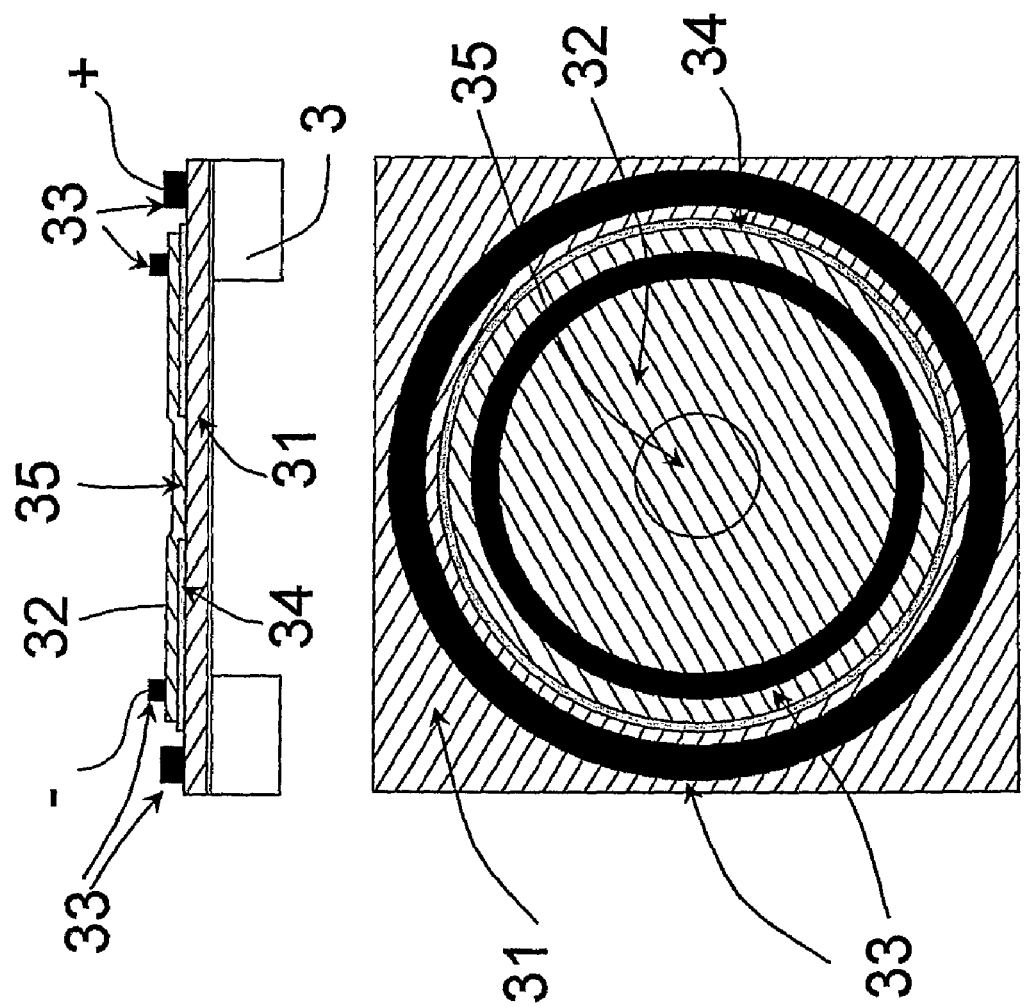
FIG. 10 illustrates an alternative emitter according to an embodiment of the invention.

FIG. 10 illustrates an emitter according to an alternative embodiment of the invention. In the embodiments discussed above the current is led through openings 12, 13 in the doped layer and is insulated from this. In FIG. 10 the current is led through the doped layer 31 and through an opening 35 in the insulating layer 34 separating it from the heater layer 32. This way the current is forced through a small area of the heater layer 32, providing a larger current in the area surrounding the opening and thus increasing the emitted IR intensity in this area.

In FIG. 10 the source is illustrated with electrodes 33 mounted on top of the emitter, but the approach illustrated in FIG. 9, with electrical contacts at the top and bottom may of course also be used with the necessary modifications, e.g. concerning the openings for leading the current to the heater layer. The electrodes 10 in FIG. 10 are ring shaped so at to provide a uniform current flow into and from the opening 35. The opening may be a complete removal of the insulating layer 34 or a thin layer may remain, especially when the drive current is pulsed or an AC current is provided.

Those skilled in the art will appreciate from what is disclosed and illustrated here that there are other examples, variations and equivalents within the scope of the invention and the claims that follow.

The invention claimed is:

1. A sealed infrared radiation source, comprising an emitter membrane being stimulated by an electrical current conducted through said membrane, said membrane thus comprising an electrical conductor, wherein the membrane comprises an electrically conductive heater layer and a highly Boron or Phosphor doped silicon layer being in thermal contact with but electrically insulated from the heater layer;

wherein the membrane is enclosed within a housing comprising a first housing part and a second housing part, at least one of the first housing part and the second housing part being transparent in the IR range, and each housing part defining a cavity between the membrane and the respective housing part on each side of the membrane; and wherein the housing parts are at least partially electrically conductive, the first housing part being electrically coupled to a first end of said electrical conductor and insulated from a second end of said electrical conductor, and the second housing part being electrically coupled to the second end of said electrical conductor and being insulated from the first end of said electrical conductor, thus allowing a current applied between an exterior portion of the first housing part and an exterior portion of the second housing part to pass through and heat said membrane.

2. The infrared source according to claim 1, comprising an integrated temperature sensitive resistor configured for monitoring the temperature of the emitter membrane.

3. The infrared source according to claim 1, comprising an integrated temperature sensitive diode configured for monitoring the temperature of the emitter membrane.

4. The infrared source according to claim 1, wherein the insulator has an electrical passage being one of an opening and a thinner area in the central part of the emitting area, so as to allow the heating current to pass through said doped layer, through said passage and through a central part of said heater layer, thus providing a maximum heating and IR emission in said central part.

* * * * *